United States Patent [19]

Baena-Arnaiz et al.

[11] Patent Number: 6,006,190

[45] Date of Patent: Dec. 21, 1999

[54] COMPUTER IMPLEMENTED METHOD AND A COMPUTER SYSTEM FOR ENFORCING SOFTWARE LICENSES

[75] Inventors: Marco T. Baena-Arnaiz, Claremont; Benjamin T. Church; Michael J. Kirchoff, both of Chino; Harish Seshadri, Claremont, all of Calif.

[73] Assignee: Tartaroukos LLC, Claremont, Calif.

[21] Appl. No.: 09/067,616

[22] Filed: Apr. 28, 1998

Related U.S. Application Data

[60] Provisional application No. 60/044,374, Apr. 28, 1997.

[51] Int. Cl.$^6$ ............................. G11B 23/28; G06F 17/60
[52] U.S. Cl. ................................. 705/1; 380/3; 380/25; 295/701; 295/702; 295/703; 295/712; 295/652
[58] Field of Search ................................. 705/1; 364/130; 380/3, 25; 395/701, 702, 703, 705, 712, 652

[56] References Cited

U.S. PATENT DOCUMENTS

| | | | |
|---|---|---|---|
| 5,133,075 | 7/1992 | Risch | 395/800 |
| 5,375,125 | 12/1994 | Oshima et al. | 371/19 |
| 5,933,498 | 8/1999 | Schneck et al. | 380/4 |

*Primary Examiner*—James P. Trammell
*Assistant Examiner*—Chinor M. Lee
*Attorney, Agent, or Firm*—Townsend and Townsend and Crew LLP

[57] ABSTRACT

A software licensing enforcement product includes a shell utilizing a device specific hardware product to encrypt the install program and the run program to prevent non-authorized devices form installing or using a software product. The shell decrypts the run program to allow the authorized device to access the software product.

9 Claims, 5 Drawing Sheets

COMPUTER IMPLEMENTED METHOD AND A COMPUTER SYSTEM FOR ENFORCING SOFTWARE LICENSES

This application claims benefit of Provisional Appl. 60/044,374, filed Apr. 28, 1997.

BACKGROUND OF THE INVENTION

Unauthorized distribution of software is a major commercial problem causing losses of billions of dollars each year to software developers.

Typically, consumer software products are sold with licenses which restrict the use of the product to operate on only a single CPU at any given time, i.e., a single-user license.

Additionally, multi-user licenses may authorize installation of a software product and use of the software product on a fixed number of CPUs at a given time.

Although many users voluntarily comply with license restrictions, a significant amount of unauthorized installation and use of licensed software exists. This unauthorized activity deprives software developers of revenue.

Accordingly, many techniques have been developed to prevent unauthorized installation and use of software products. Many solutions employ specialized hardware to prevent unauthorized activity. Current security measures offered by software developers require the inputting of passwords and/or product serial numbers in order to activate installation and/or execution of the main program. These measures have been proven ineffective. Accordingly, efforts continue to improve protection for software developers against illegal distribution of software.

SUMMARY OF THE INVENTION

According to one aspect of the invention, a software solution of enforcing licensing restrictions generates a device-specific hardware key for encrypting program data transferred to an installation medium. If the installation medium is transferred to another unauthorized device a different hardware specific key is generated which prevents decryption of the program data stored on the installation medium to prevent unauthorized installation.

According to another aspect of the invention, a run file, which is executed to access and use a software product, is stored on the data processor in an encrypted format. When the run file is invoked by a user, a shell program decrypts the file, using the hardware specific key, and loads the decrypted run file in main memory. The decrypted run file is then executed. When use of the software product is terminated the decrypted run file is erased from memory. Thus, the run file cannon be copied from the hard drive of an authorized CPU for use on an unauthorized CPU.

According to another aspect of the invention, when a given number of multiple users is authorized, an installation counter is checked each time the software product is installed. If, for a given installation, the value of the installation counter exceeds the given number, installation is prevented.

According to another aspect of the invention, if the software product is previously installed it is encrypted utilizing the device-specific hardware key of the previous installation. This device-specific hardware key can not be generated on a different machine so installation is blocked.

According to another feature of the invention, a program image loaded into memory includes an unencrypted shell part and an encrypted part. The shell decrypts the encrypted part in main memory and then program control is transferred to the newly decrypted part.

Other features and advantages of the invention will be apparent in view of the following detailed description and appended drawings.

DESCRIPTION OF THE PREFERRED EMBODIMENT

Figure 1:
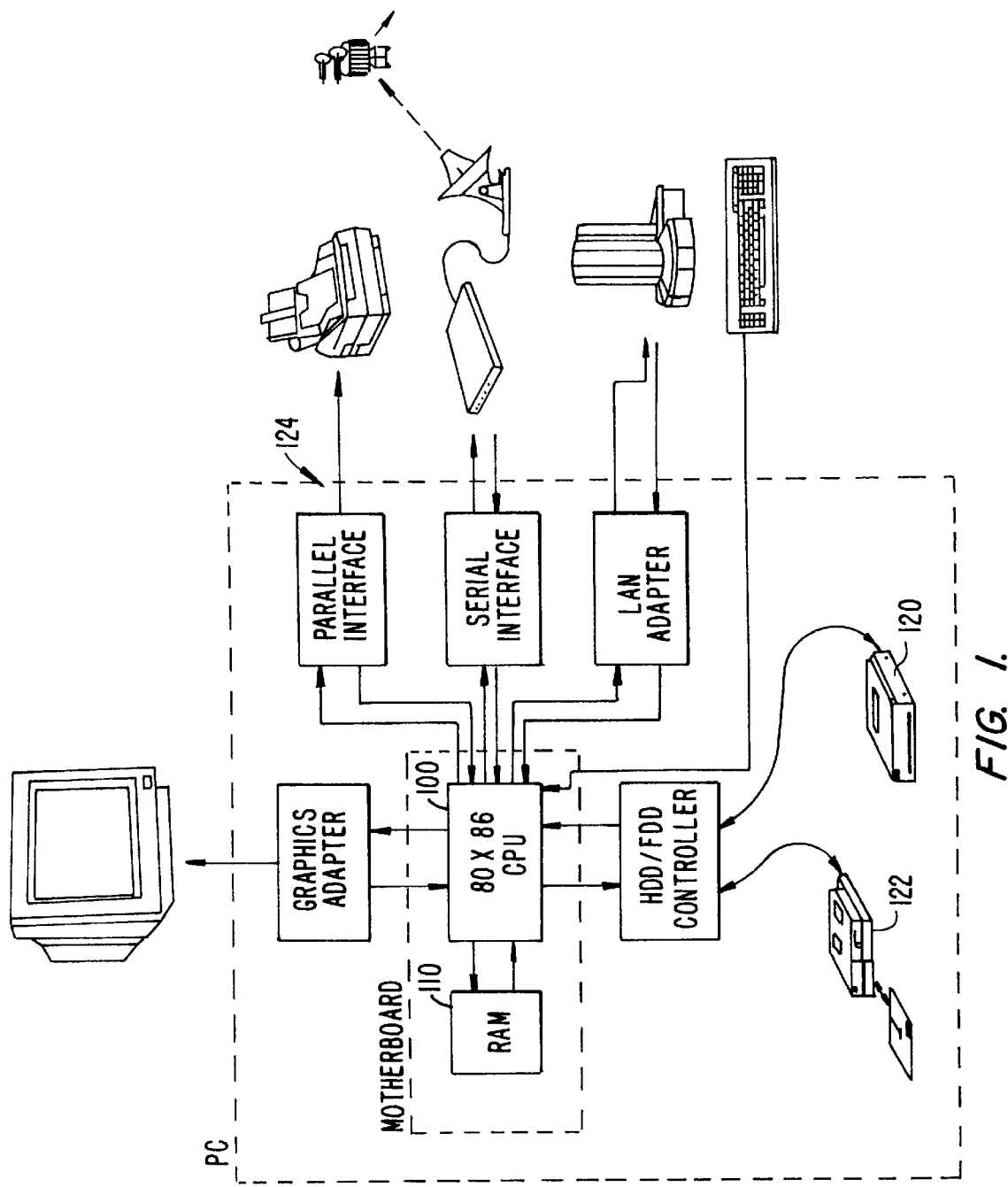
FIG. 1 is a schematic diagram of a standard data processing system.

FIG. 1 is a typical prior art data processing system, including a CPU 100 and main memory 110 (RAM) which holds programs and data to be executed by the CPU 100. Typically long term storage of data is done on a hard disk drive 120 (HDD). Input can be via an input media 120, e.g., floppy disk, CD, or DVD devices, or via other I/O interfaces 124.

According to one embodiment, a Licensing Enforcement Product (LEP) offers protection against the illegal distribution of software products for developers of the DOS and Windows platforms. The LEP ensures that the regulations imposed by software licensing agreements for the mass-market are followed strictly, so that a licensed software product operates on only one single CPU at any given time. This is referred to this as single-mode usage. Single-mode users are permitted to transfer a licensed software product between different CPUs in so far as there are not two copies of a single licensed product installed concurrently. Therefore, the LEP insures that single-mode usage licenses are upheld by using CPU specific data to encrypt the installed software product and then to write this CPU specific encryption data to a floppy diskette which is required for installation. Therefore, the LEP is present on this installation diskette, hereafter referred to as the Installation Diskette (ID), which is required for each installation.

In single-mode usage, this diskette cannot be transferred to a different PC since the data written on that diskette is specific to the current installation on the initial PC. Once the software product has been properly uninstalled, the CPU specific information is no longer operative on the installation diskette and the software product can be legally transferred to a different PC. Therefore, it is necessary for the LEP to be active in both the installation procedures and the main program execution of any software product which utilizes this protection scheme. In cases where the software product is delivered to end-users in a CD-R, CD-RW, or a DVD format the ID is not necessary. All necessary information is transferred directly to the CD.

It is assumed that majority of users will be operating in single-mode usage. The LEP does support software products which offer multiple licenses per single software product purchases.

The ID is the only indication to the end-user that any security measures might be employed. Thus, the LED is not an alteration of the "normal installation procedure" and the LEP is absolutely unobtrusive and transparent to the legal end-user. Security measures are only activated by illegal usage, and require no input from a legal end-user.

In the present embodiment, illegal end-users will be confronted with a series of obstacles designed to deter the intrusion of illegal users into the code of the LEP as well as the code of a customer's software product. As such, the LED product does become obtrusive when illegal actions are performed such as the attempt to load a software product with a single-mode usage license on multiple CPUs concurrently, the attempt to "crack" the software product so as to overcome protection routines, and the attempt to alter a software developer's product to any unauthorized degree.

The LEP is delivered as a "shell" which is fused around the original code of a software product protected by the LEP. Therefore the LEP is not technically a separate program from a protected software product nor does it interfere with the original code. In fact, developers intending on using the LEP protection scheme do not need to alter their program to any degree in order for the protection shell to be operative. Also, the LEP does not alter or interfere with the normal operation of a software developer's product to any significant degree. Therefore, this program is unobtrusive and transparent to software developers as well.

The LEP shell can be seen as a set of two types of processes, proactive and reactionary. The LEP shell is operative during both the installation of a licensed software product as well as during each running of the main program executable. Hereafter the following terminology is used to refer to the generic installation and main execution programs: Install.exe and Run.exe respectively. Install.exe is defined as any program which is responsible for the transfer and configuration of program and data files from the product as delivered by a software developer (Floppy Diskette and/or CD-ROM) to the end-user's hard drive. Install.exe then refers to the union of the LEP and the native installation routine, referred to the install main routine, provided by a software developer. Therefore the native installation routine refers to the install main program designed by the software developer which moves the program files from the distribution medium to the end-user's hard disk and creates the necessary file structure for proper execution. Run.exe is defined as the main executable which end-users utilize in order to access the desired application and is also comprised of the LEP. The LED shell comprised header and middle parts encrypted with different keys.

The LEP is active in both the installation (Install.exe) and main execution (Run.exe) processes. These operations can be defined as proactive and reactionary. As proactive, the LEP provides protection schemes which attempt to deter any illegal usage and/or actively monitor that only legal input is being received from the end-user. As reactionary, the LEP provides routines which are not activated until illegal input from an end-user is received and provides a set of measures which punish illegal users, while leaving legal users unaffected.

The following outline will distinguish the process of the LEP as divided between proactive and reactionary:
3. Proactive
  A. Encrypting/Decrypting Agent
    1. Standard Key Encryption/Decryption
    2. Hardware Specific Encryption/Decryption
    3. Dynamic Decryption in Memory
  B. Installation Counter
  C. Memory Checksum
  D. Anti-Debugging Tricks
    1. Timer
    2. Debugger Detection
4. Reactionary
  A. Punishment Routines
    1. Termination of Program
    2. Loss of Installation
    3. Loss of Program The operation of each of these processes is described below as distinct units (Process Description) and then a description follows as to how each unit functions in relation to the whole of the LEP (Operational Outline). The Operational Outline is divided between the processes of the LEP as it relates to Install.exe and as it relates to Run.exe. Each process is considered unique as it is developed.

Process Description

1. Proactive

These processes are active during the execution of both Install.exe and Run.exe. As proactive they attempt to ensure single-mode usage and to monitor for illegal usage.

A. Encrypting/Decrypting Agent

The processes described in this section refer to the encryption and decryption of the files of a software developer's product, especially Install.exe and Run.exe insofar as the LEP shell has been fused around these programs.

1. Standard Key Encryption/Decryption

The standard key is a 64-bit key used to encrypt/decrypt data. The key is used by a encryption algorithm when encrypting the data, or by a decryption algorithm, when decrypting the encrypted data. These algorithms support the use of a 64-bit key. The key name has a string format (e.g. "ThekeyXX"). The files Install.exe and Run.exe will be encrypted using this key prior to the initial installation of a software product. The process of encryption and decryption is performed by the LEP shell.

2. Hardware Specific Encryption/Decryption

The hardware key is a 64-bit key and is hardware specific, a hard key. A hardware specific key is fabricated from hardware parameters. The purpose of having a hardware key is to encrypt or decrypt the data specific to the hardware used. The hardware specific key is fabricated by obtaining relevant parts of the BIOS information from the hardware which might vary from computer to computer. The start of the relevant BIOS information resides in the memory address FFFFH:OOOOH (where FFFFH is the segment, and OOOOH is the offset). The following contains a listing of BIOS information parameters that might vary from computer to computer:
    A) BIOS revision date
    B) BIOS version number
    C) BIOS manufacturer's name
    D) Other characters within the BIOS information The hardware specific key is used to encrypt the contents of the ID and the installed main executable, Run.exe, of the software product, thereby replacing the standard key described above.

3. Dynamic Decryption in Memory

Figure 2:
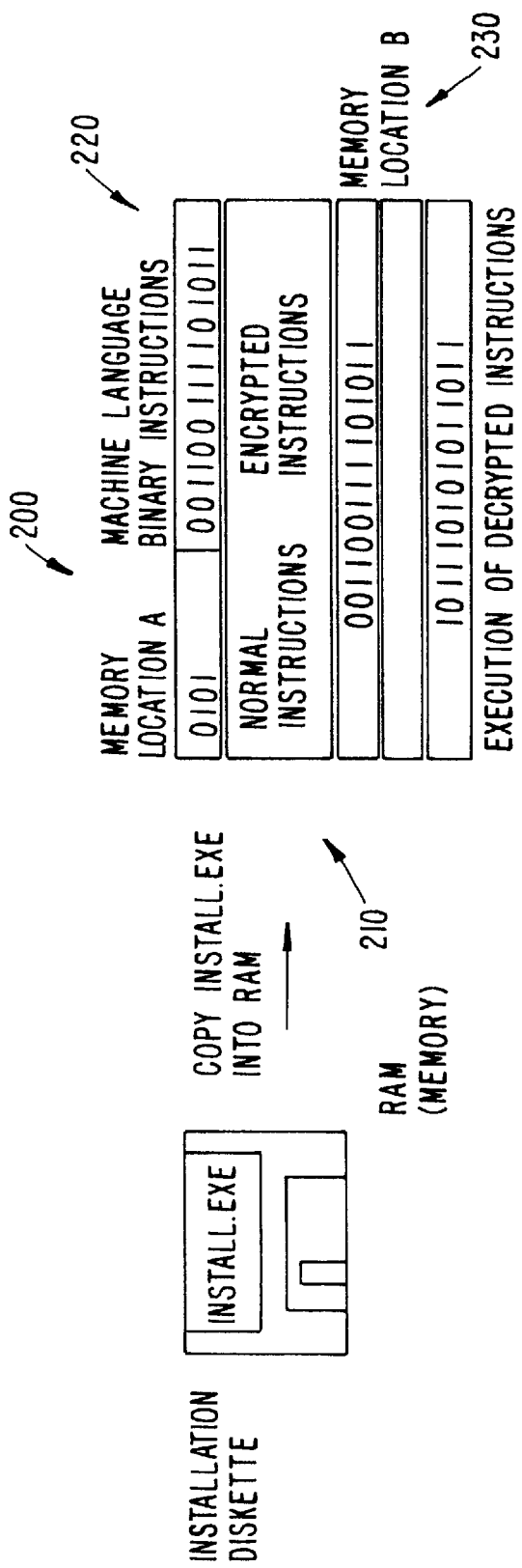
FIG. 2 is a schematic diagram of a dynamic encryption/decryption process.

Dynamic decryption in memory will now be described with reference to FIG. 2. The LEP shell exists as an unencrypted portion 200 of Install.exe and Run.exe which acts as a decrypting/encrypting agent. During the execution of Install.exe or Run.exe, this decrypting/encrypting agent loads the program image into main memory 200, and decrypts the encrypted portions 220 of the executable with the appropriate key. After decryption, the program passes control to the newly decrypted part 230. At which point the main portion of the program executes normally, either installing the software product or running the application.

B. Installation Counter

In order to provide a limited number of installations, an installation counter is used. This installation counter keeps track of the condition of part of the executable file and encrypts part of it by the number of times it is installed. Thus, an executable file which has been installed twice part of it would be doubly encrypted, had it been installed three times it part of it would be triply encrypted, and so on. The installation counter keeps track of the number of encryption layers within the executable file. When the program is run, after having been installed a specific number of times (but still less than the maximum number), the partly encrypted files are decrypted in memory by the number of times it was encrypted.

Decryption is performed several times with the use of the proper key until the format of a part of the file is recognized. When the maximum number of installations is reached, the installation counter refuses to encrypt the file any further, and the decryption process for the file is fully disabled.

C. Memory Checksum

Performs a memory checksum of the whole code. So if any portions of the code are modified by a debugger or another program (e.g. TSR). The memory checksum value will not match the one expected, this will start a punishment routine.

The technical idea behind the memory checksum is to read the whole code segment in memory, character by character. As a character is read it is multiplied by a certain value and summed to the next character which is also multiplied by a value and so on. By doing this we make the ordering of the data in memory important to the process. Please refer to checksum.cpp.

D. Anti-Debugging Tricks

These are a set of operations which occur during the execution of Install.exe and Run.exe in order to insure that the program is executing normally. End-user initiated interference with the normal operation of the program is a violation of the licensing agreements provided by mass-market software products.

1. Timer

The technique is simple: a clock tick measurement is taken before and after a process runs. The first clock tick measurement represents the starting clock tick, after the process is done, the ending clock tick measurement is taken, which represents the finished clock tick. These values are subtracted from each other. This gives the duration value in clock ticks. If this duration value is greater than a specified tolerance than we know a debugger is being used. During normal execution, the duration value will be less than the specified tolerance.

2. Debugger Detection

The basic notion is to detect that a specific debugger program has been used to run the program. The LEP will target debugging software available in the mass market. The detection process of a specified debugger is done in the following manner. When a debugger program is loaded to memory, usually conventional memory (but could be also loaded to extended memory), the LEP detects it by performing an unique string search over the whole memory region. The detected string will be crucial code, specific to a debugger program, when loaded and run in memory. Once the detection is performed, we overwrite the crucial area of the debuggers' code with garbage. So when the debugger starts executing it crashes. The user will typically load the program unto the debugger and attempt to debug it. The string detection code will be deeply encrypted within the file, but when execution of the program begins, the string detection code decrypts itself and performs all the necessary actions.

II. Reactionary

These processes are activated only by the violation of the licensing agreement. End-users performing illegal operations will be detected by the proactive processes described above and will be punished as describe below. These punishments are not set parameters within the LEP and will be determined by software developers choosing to use the protection scheme.

A. Punishment Routines

1. Termination of program

Program will terminate once an illegal operation occurs. If this operation occurs as the result of an external program which is in use by the end-user for the illegal alteration of a software product under the LEP protection, the external product will be adversely affect but not permanently damaged.

2. Loss of Installation

If illegal operation by an end-user is detected it is possible for the LEP to terminate the licensed software product and to assign new values to the installation counter so that the counter reads one installation less than actual installations. For, example if a user has installed the product legally three times, and then performs an illegal operation the installation counter will read as if there had been four installations. Also, the installation counter can be set so that after an illegal operation is detected all further installations are invalid, hence the counter would read as having reached the maximum number of installs. The removal of an installation is accomplished by decrypting the multiply encrypted program by one time.

3. Loss of Program

If illegal operation by an end-user is detected it is possible for the LEP to remove itself from the hard drive of the end-user. This type of punishment can be used in conjunction with the loss of installation so that the user is required to utilize one of his/her limited number of installations to restored the application. This type of punishment generates a flag which is written to the end-user's hard drive. This flag would be a signal to the LEP resident around Install.exe to terminate installation procedures and then to disable the ID from further usage. Removing the files from the diskette can be achieved by first encrypting the file and using the remove () function in the C-library <stdio.h>, which deletes files specified by path.

Operational Outline

Preferred Embodiment

This applies to scenarios in which the LEP provides management of the transferring of files from the delivery medium to the hard drive.

Installation Process

Figure 3:
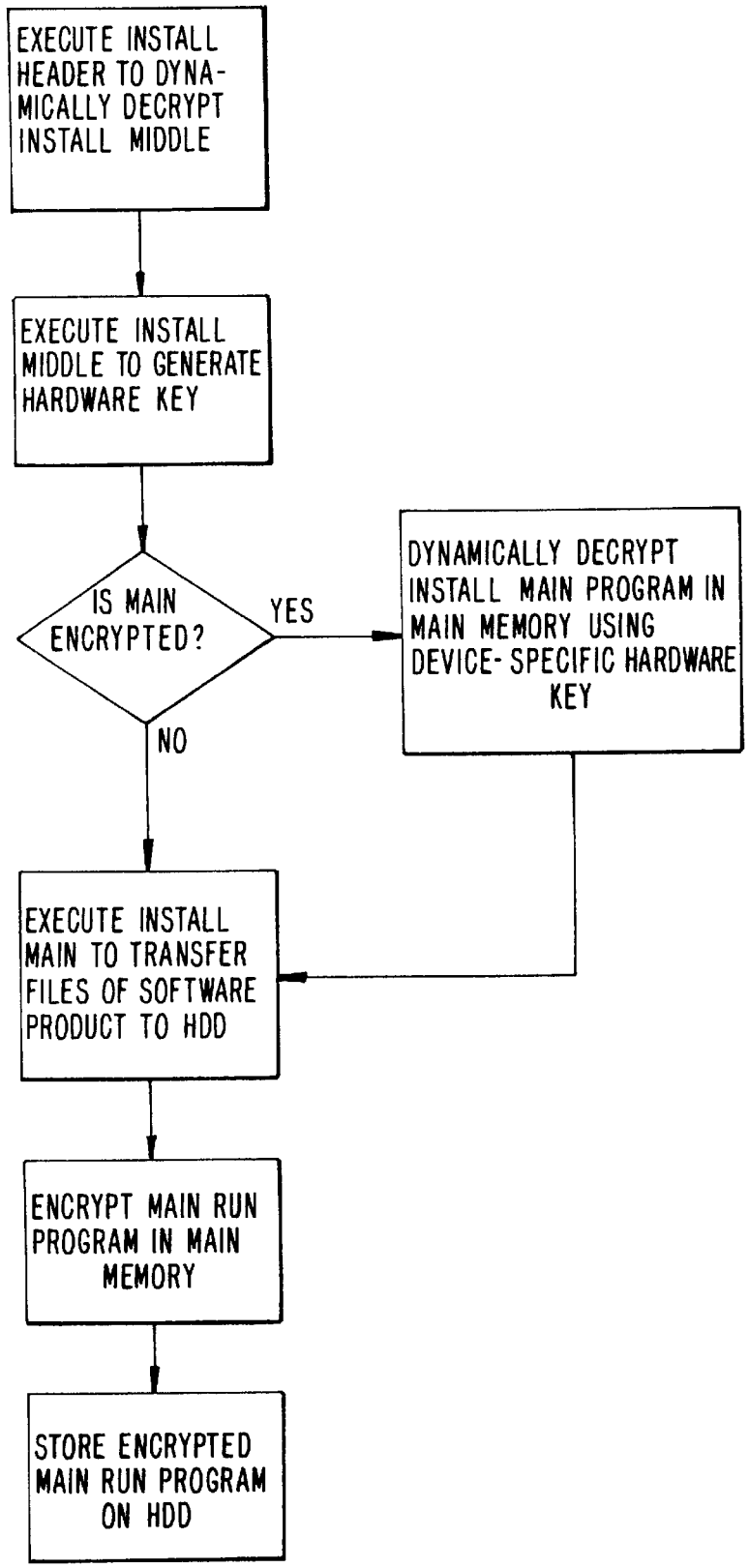
FIG. 3 is a flow chart depicting the steps of installing a software product utilizing the preferred embodiment.

As depicted in the flow chart of FIG. 3, the installation can be modeled into the following steps:

1. InstalL exe is loaded into memory by the operating system from the ID.
2. The LEP performs a check for active debuggers, and if it is a punishment routine will start. Through the following process the anti-debugging tricks are present and active (cf. Process Description I.E.1 and 2) and if a violation is detected a punishment routine will begin.
3. The LEP performs dynamic decryption in memory (cf. Process Description I.A.3) of the native installation routine and starts executing.

4. The LEP retrieves information from the computer's ROM BIOS and fabricates a hard key out of it. This hard key is used to re-encrypt the code in memory and the Install.exe file (cf Process Description I.A.2).
5. The number of the installations counter is updated by one (cf. Process Description I.C). Thus, the installation is tied down to that specific computer.
6. During execution of the Install.exe file. The standard encrypted files (cf Process Description I.A.1) of the protected software are copied to memory, decrypted, and copied to the hard disk in a specified directory. This is done by using regular copying routines provided in C-libraries. The transferring of files from the delivery medium to the hard drive can be performed by the native installation routine provided that the software developer has incorporated the above-described decryption routine.
7. During the physical installation of the main executable file, Run.exe, of the software product, this file is copied to memory, decrypted, and encrypted with the hard key, before being copied to the hard disk.

Execution Process

Figure 4:
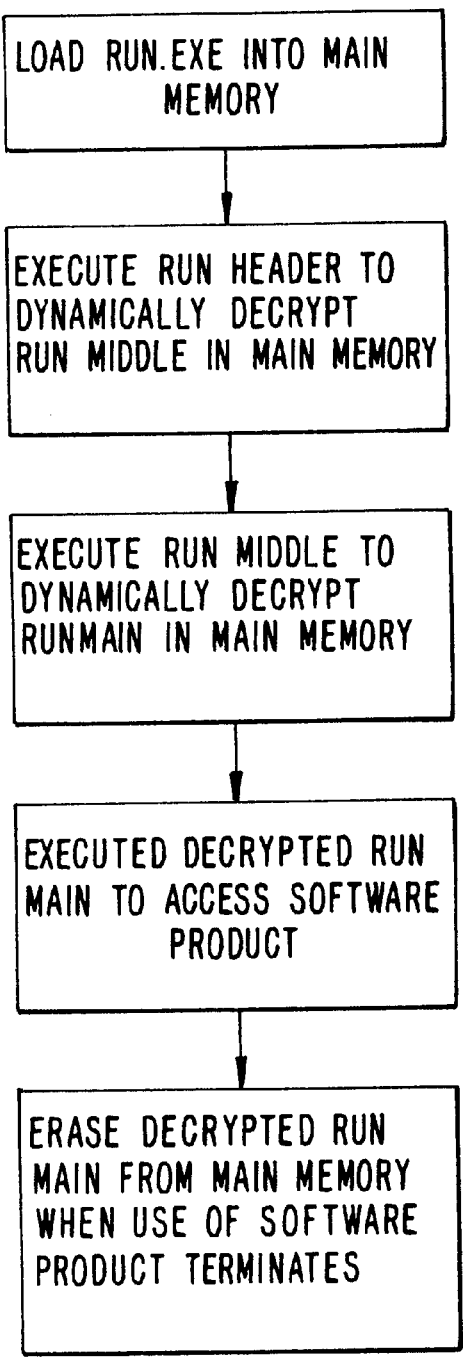
FIG. 4 is a flow chart depicting the steps of running a software product utilizing the preferred embodiment.

As depicted in FIG. 4, the execution of the main program can be modeled into the following steps:
1. Run.exe is loaded into memory by the operating system.
2. A check is performed for active debuggers, and if it is a punishment routine will start. Throughout the following process the anti-debugging tricks are present and active (cf. Process Description I.E.1 and 2) and if a violation is detected a punishment routine will begin.
3. The LEP performs a verification that the proper hard key encryption is present, if not a punishment routine begins.
4. The LEP performs dynamic decryption in memory (cf Process Description I.A.3).
5. The LEP performs a memory checksum of the LEP shell (cf. Process Description I.D.)
6. The LEP hands off of execution to the main program.

Figure 5:
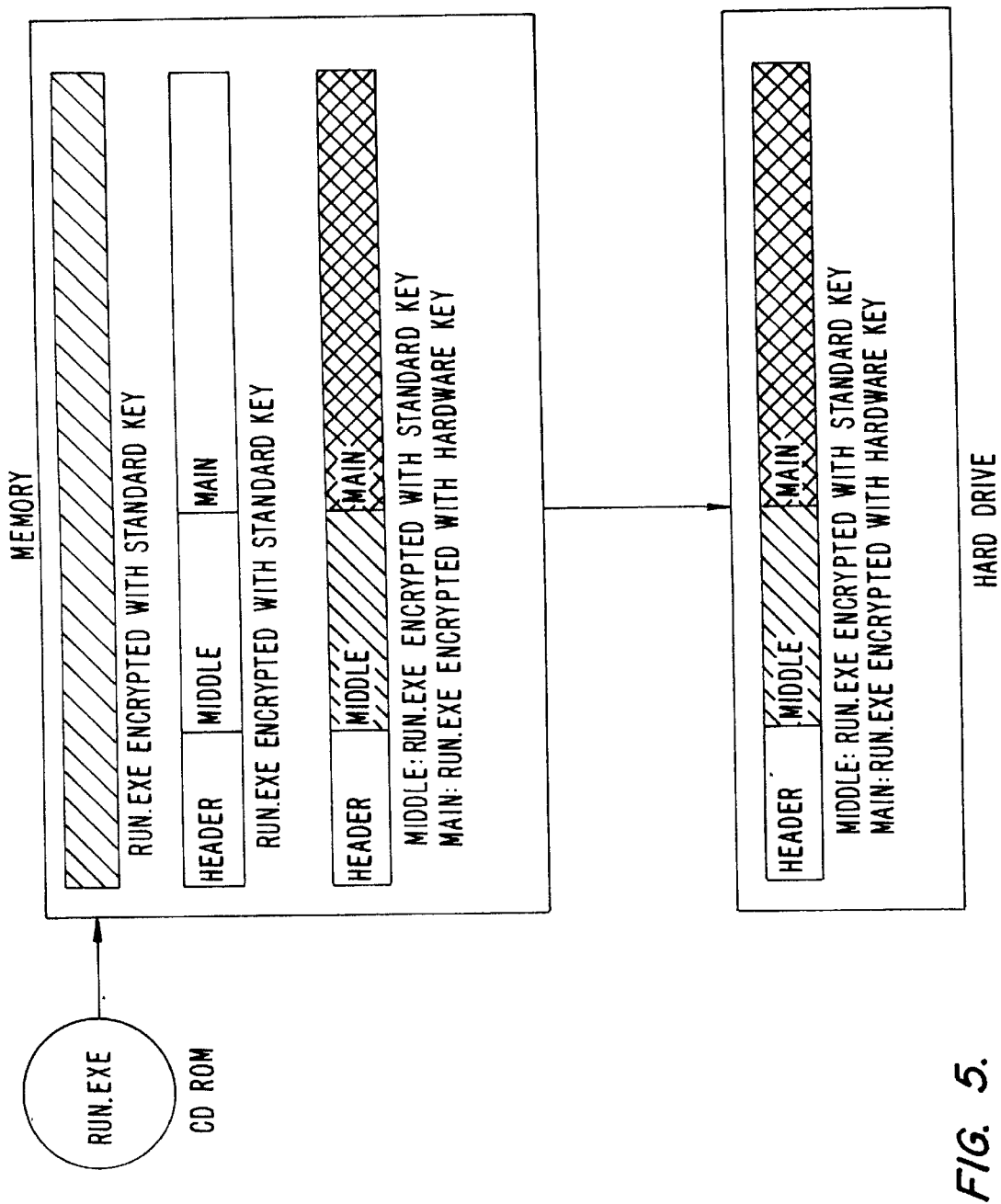
FIG. 5 is a schematic diagram of data structures in main memory during the dynamic encryption/decryption process.

The format of run.exe in the main memory and on the hard drive is depicted in FIG. 5.

Secondary Embodiment

The secondary embodiment of the LEP is necessary only if a software developer desires that its code not be modified in any way by the LEP. The necessary changes occur only in the Install.exe and are as follows:

Installation Process

The installation can be modeled into the following steps:
1. Install.exe is loaded into memory by the operating system from the ID.
2. The LEP performs a check for active debuggers, and if it is a punishment routine will start. Through the following process the anti-debugging tricks are present and active (cf. Process Description I.E.1 and 2) and if a violation is detected a punishment routine will begin.
3. The LEP performs dynamic decryption in memory (cf. Process Description I.A.3) of the native installation program and starts executing.
4. The LEP retrieves information from the computer's ROM BIOS and fabricates a hard key out of it. This hard key is used to re-encrypt the code in memory and the Install. exe file (cf. Process Description I.A.2).
5. The number of the installation counter is updated by one (cf. Process Description I.C). Thus, the installation is tied down to that specific computer.
6. The execution is turned over to the native installation routine. After this process is complete, control is returned to the LEP.
7. The standard encrypted files (cf. cf. Process Description I.A.1) of the protected software are copied to memory from the hard disk, decrypted, and copied back to the hard disk in the proper directory.
8. The main executable file, Run.exe, of the software product is copied to memory, decrypted using the standard key, encrypted with the hard key, and copied back to the proper directory on the hard disk.

Execution Process

The execution of the main program can be modeled into the following steps:
1. Run.exe is loaded into memory by the operating system.
2. A check is performed for active debuggers, and if it is a punishment routine will start. Throughout the following process the anti-debugging tricks are present and active (cf. Process Description I.E.1 and 2) and if a violation is detected a punishment routine will begin.
3. The LEP performs a verification that the proper hard key encryption is present, if not a punishment routine begins.
4. The LEP performs dynamic decryption in memory (cf. Process Description I.A.3).
5. The LEP performs a memory checksum of the LEP shell (cf. Process Description I.D).
6. The LEP hands off of execution to the main program.

What is claimed is:

1. A method for preventing non-authorized installation of a licensed software product provided by a software developer, with the method performed by a data processor including main memory, a CPU, and non-volatile read/write storage, and non-volatile ROM including a BIOS file including device-specific parameters unique to each data processor, and an input device for reading and writing to input storage media, said method comprising the steps of:

providing an input media including install.exe and run.exe programs stored thereon, with said install.exe program including a shell install program, having header and middle parts, and a main install program, with the main install program being the install program supplied by the software developer and with the run.exe program including a run shell program having header and middle parts, and a main run program, with the main run program being the program supplied by the software developer, and with said middle parts of said shell main and run programs encrypted with a standard key;

transferring said install.exe program from said input media to said main memory;

executing said header part of the install shell program to decrypt said install middle part of the shell install program utilizing the standard key to generate and store in main memory a decrypted install middle part;

executing said decrypted install middle part to:
read said device-specific parameters;
fabricate a device-specific hardware key;

executing said main install program to transfer said run.exe file and files of said software product to said non-volatile read/write storage;

executing said install header part to encrypt the main run program of the run.exe file stored on said nonvolatile read/write storage utilizing the device-specific hardware key;

executing said header part of said install shell program to encrypt said instal main program utilizing said hardware key to form an encrypted main install program;

transferring said encrypted main install program to said installation media.

2. The method of claim 1 wherein said middle part of the install shell, when executed, further performs the steps of:

checking whether the main install program is encrypted;

if yes, determining whether the device-specific hardware key of the data processor executing the middle part has been used to encrypt the main install program;

if yes, utilizing the device-specific hardware key of the data processor executing the middle part to decrypt the main install program.

3. The method of claim 1, wherein said middle part of the install shell, when executed, further performs the steps of:

checking an install counter value indicating the number of time the software product has been installed in different data processors;

if said install counter is greater than a predetermined number, terminating installation.

4. The method of claim 1 further comprising the steps of:

loading the run.exe file stored on said non-volatile read/write storage into main memory;

executing said header part of the run shell program to decrypt said run middle part of the shell install program utilizing the standard key to generate and store in main memory a decrypted run middle part;

executing the decrypted middle part of the run shell to decrypt the encrypted main run program utilizing the device-specific hardware key to generate and store in main memory a decrypted main run program;

execute said decrypted main run program to access the licensed software product; and erasing said decrypted main run program from main memory when use of the licensed software product is terminated.

5. A method for preventing non-authorized use of a licensed software product provided by a software developer, with the method performed by a data processor including main memory, a CPU, and non-volatile read/write storage, and nonvolatile ROM including a BIOS file including device-specific parameters unique to each data processor, with a run.exe file stored on said non-volatile read/write storage including an encrypted main run program being a main run program, being part of said licensed software product encrypted utilizing a device-specific hardware key fabricated from device-specific parameters, and with a run shell program, and also including header and middle parts, with the middle part encrypted with a standard key, said method comprising the steps of:

loading the run.exe file stored on said non-volatile read/write storage into main memory;

executing said header part of the run shell program to decrypt said run middle part of the shell install program utilizing the standard key to generate and store in main memory a decrypted run middle part;

executing the decrypted middle part of the run shell to decrypt the encrypted main run program utilizing the device-specific hardware key to generate and store in main memory a decrypted main run program;

execute said decrypted main run program to access the licensed software product; and erasing said decrypted main run program from main memory when use of the licensed software product is terminated.

6. A system for preventing non-authorized installation of a licensed software product provided by a software developer, said system comprising:

a data processor including main memory, a CPU, and non-volatile read/write storage, and non-volatile ROM including a BIOS file including device-specific parameters unique to each data processor, and an input device for reading and writing to input storage computer usable media including install.exe and run.exe programs stored thereon, with said install.exe program including a shell install program, having header and middle parts, and a main install program, with the main install program being the install program supplied by the software developer and with the run.exe program including a run shell program having header and middle parts, and a main run program, with the main run program being the program supplied by the software developer, and with said middle parts of said shell main and run programs encrypted with a standard key;

with said computer usable medium having a computer readable program code embodied therein for directing operation of said substrate processing system, said computer readable program code including:

computer readable program code for causing said CPU to transfer said install.exe program from said input media to said main memory;

computer readable header part of a shell program code for causing said CPU to decrypt said install middle part of the shell install program utilizing the standard key to generate and store in main memory a decrypted install middle part and causing said CPU to execute said decrypted install middle part to:

read said device-specific parameters;

fabricate a device-specific hardware key;

computer readable main install program code for causing said CPU to transfer said run.exe file and files of said software product to said non-volatile read/write storage;

computer readable header part of said shell program code for causing said CPU to encrypt the main run program of the run.exe file stored on said non-volatile read/write storage utilizing the device-specific hardware key;

computer readable header part of said shell program code for causing said CPU to encrypt said instal main program utilizing said hardware key to form an encrypted main install program;

computer readable program code for causing said CPU to transferring said encrypted main install program to said installation media.

7. A system for preventing non-authorized installation of a licensed software product provided by a software developer, said system comprising:

a data processor including main memory, a CPU, and non-volatile read/write computer usable medium, and non-volatile ROM including a BIOS file including device-specific parameters unique to each data processor, with a run.exe file stored on said non-volatile read/write computer usable medium including an encrypted main run program being a main run program, being part of said licensed software product encrypted utilizing a device-specific hardware key fabricated from device-specific parameters, and with a run shell program, and also including header and middle parts, with the middle part encrypted with a standard key, with said computer usable medium having a computer readable program code embodied therein for directing operation of said substrate processing system, said computer readable program code including:

computer readable program code for causing said CPU to load the run.exe file stored on said non-volatile read/write storage into main memory;

computer readable header part of the run shell program code for causing said CPU to decrypt said run middle part of the shell install program utilizing the standard key to generate and store in main memory a decrypted run middle part and for causing said CPU to executing the decrypted middle part of the run shell to decrypt the encrypted main run program utilizing the device-specific hardware key to generate and store in main memory a decrypted main run program;

computer readable program code for causing said CPU to execute said decrypted main run program to access the licensed software product; and computer readable program code for causing said CPU to erasing said decrypted main run program from main memory when use of the licensed software product is terminated.

8. A method for preventing non-authorized installation of a licensed software product provided by a software developer, with the method performed by a data processor including main memory, a CPU, and non-volatile read/write storage, and non-volatile ROM including a BIOS file including device-specific parameters unique to each data processor, and an input device for reading and writing to input storage media, said method comprising the steps of:

transferring a program image of an install file, with the program image including an unencrypted shell and an encrypted main install program, from the input storage media to main memory;

executing the unencrypted shell to dynamically decrypt the encrypted main install file to generate an unencrypted main install program in memory;

transferring control to said decrypted main program in main memory to install the licensed software product.

9. A method for preventing non-authorized use of a licensed software product provided by a software developer, with the method performed by a data processor including main memory, a CPU, and non-volatile read/write storage, and non-volatile ROM including a BIOS file including device-specific parameters unique to each data processor, with a run.exe file stored on said non-volatile read/write storage including an encrypted main run program, being part of said licensed software product encrypted utilizing a device-specific hardware key fabricated from device-specific parameters, and with a run.exe file also including a run shell program, that includes a header and middle parts, with the middle part encrypted with a standard key, said method comprising the steps of:

transferring a program image of a run file, with the program image including an unencrypted shell and an encrypted main run program, from the non-volatile read/write storage to main memory;

executing the unencrypted shell to dynamically decrypt the encrypted main run file to generate an unencrypted main run program in memory;

transferring control to said decrypted run program in main memory to access the licensed software product; and erasing said decrypted run file from main memory when use of said software product is terminated.

\* \* \* \* \*